United States Patent
Wirtz

(10) Patent No.: US 6,990,218 B2
(45) Date of Patent: Jan. 24, 2006

(54) METHOD FOR DISTURBANCE-COMPONENT-FREE IMAGE ACQUISITION BY AN ELECTRONIC SENSOR

(75) Inventor: Brigitte Wirtz, Holzkirchen (DE)

(73) Assignee: Infineon Technologies AG, Munich (DE)

(*) Notice: Subject to any disclaimer, the term of this patent is extended or adjusted under 35 U.S.C. 154(b) by 479 days.

(21) Appl. No.: 10/266,596

(22) Filed: Oct. 7, 2002

(65) Prior Publication Data

US 2003/0068073 A1 Apr. 10, 2003

Related U.S. Application Data

(63) Continuation of application No. PCT/EP01/03477, filed on Mar. 27, 2001.

(30) Foreign Application Priority Data

Apr. 5, 2000 (EP) .................................. 00107388

(51) Int. Cl.
  G06K 9/00 (2006.01)

(52) U.S. Cl. .................. 382/124; 382/275; 283/68; 340/5.53; 340/5.83

(58) Field of Classification Search ............... 382/100, 382/115, 124, 125, 127; 283/68–70; 235/494; 340/5.52, 5.53, 5.82, 5.83; 396/14, 15; 434/155; 356/71

See application file for complete search history.

(56) References Cited

U.S. PATENT DOCUMENTS

| 4,242,705 | A | * | 12/1980 | Ebihara | 348/620 |
| 5,987,156 | A | | 11/1999 | Ackland et al. | |
| 6,125,192 | A | * | 9/2000 | Bjorn et al. | 382/124 |
| 6,330,345 | B1 | * | 12/2001 | Russo et al. | 382/115 |
| 6,408,087 | B1 | * | 6/2002 | Kramer | 382/124 |

FOREIGN PATENT DOCUMENTS

| WO | WO 98/8371 | * 10/1998 |
| WO | WO 98/48371 | 10/1998 |
| WO | WO 99/6187 | * 5/1999 |
| WO | WO 99/26187 | 5/1999 |

OTHER PUBLICATIONS

Jae S. Lim: "Two-Dimensional Signal And Image Processing", *Prentice-Hall, Inc.*, 1990, p. 537.
Mr. Lin: "Signal to Noise ratio of an Image", *Digital Signal, Image and Voice Processing, Taiwan*, Jun. 1997, pp. 4-16 to 4-18.

* cited by examiner

*Primary Examiner*—Samir Ahmed
*Assistant Examiner*—Anand Bhatnagar
(74) *Attorney, Agent, or Firm*—Laurence A. Greenberg; Werner H. Stemer; Ralph E. Locher

(57) ABSTRACT

In a fingerprint sensor that effects capacitive measurement, a sequence of fingerprint images is recorded while a finger is placed on to the sensor. By comparing the best image with previous images of the sequence, the real constituent parts of the present image are determined and the remaining constituent parts are eliminated from the best image. Thus, residual prints and disturbance components brought about by contamination of the bearing area can be eliminated from the fingerprint image.

7 Claims, 1 Drawing Sheet

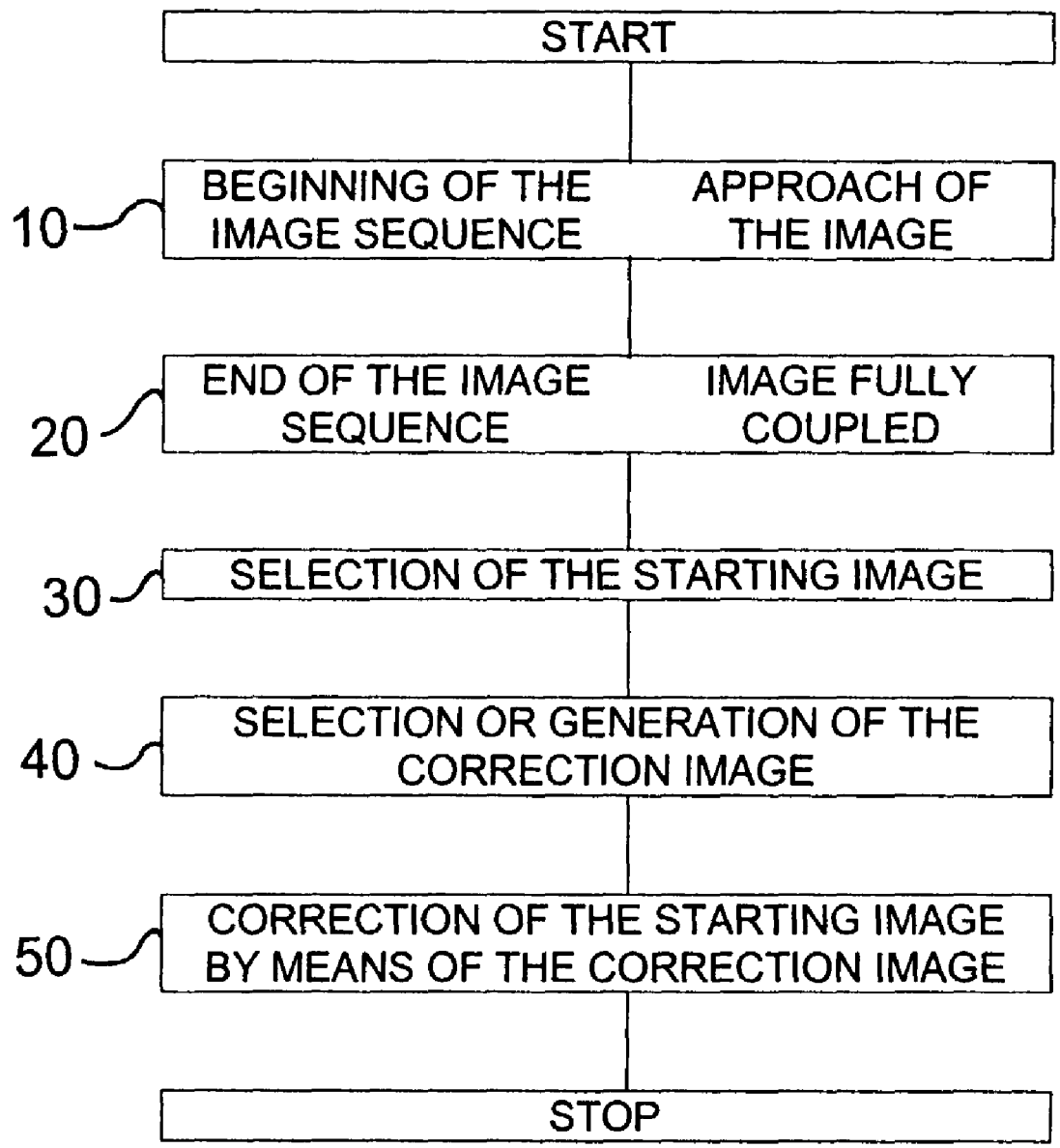

METHOD FOR DISTURBANCE-COMPONENT-FREE IMAGE ACQUISITION BY AN ELECTRONIC SENSOR

CROSS-REFERENCE TO RELATED APPLICATION

This application is a continuation of copending International Application No. PCT/EP01/03477, filed Mar. 27, 2001, which designated the United States and was not published in English.

BACKGROUND OF THE INVENTION

Field of the Invention

The present invention relates to a method for the correct and disturbance-component-free acquisition of an image that is recorded by an electronic sensor, in particular by an electronic sensor that effects capacitive measurement, such as e.g. a fingerprint sensor.

In image acquisition sensors that operate capacitively, a raster-type configuration of conductor areas that form the individual sensor elements is situated at a sensor area. The imaging quality achieved by the sensor, in particular contrast and brightness, depends on how good the connection is to the image which brings about the measured changes in capacitance, in particular—in the case of a fingerprint sensor which is principally of interest here—how firmly a fingertip is placed on to the bearing area of the fingerprint sensor. If the finger is only placed lightly thereon, then a fingerprint image is produced which has a small area and only a small amount of dark gray components. If the finger is pressed firmly on to the sensor, then the area of the fingerprint image is increased and the gray components in the image are shifted toward darker values. When the finger reaches a short distance from the bearing area during emplacement, an as yet incomplete fingerprint image can already be generated since the capacitance of the conductor areas that is measured with respect to the skin surface can already make up a difference with respect to the basic state of the sensor.

Such an as yet incomplete imaging which is generated during the production of the connection to the object to be imaged can contain disturbance components which are not manifested by themselves but, in conjunction with the changes in capacitance caused by the coupled image, corrupt the reproduction of the currently acquired image. The disturbance components may originate from contamination or damage of the bearing area and are generally so weak that they cannot be acquired as an independent image.

Fingerprint sensors which effect a capacitive measurement are constituent parts of biometric identification systems for identifying persons or for verifying an access authorization, in which, using electronic devices, a fingerprint is recorded and its essential characteristics are compared with stored reference data. Reference data are, in particular, the so-called minutiae that represent the relevant points of the fingerprint. These points are especially the ramifying locations of the valleys and ridges of the surface of the skin. It is conceivable for the residues that are formed by a thin greasy layer and remain after a finger has been placed on the bearing area to be used again for recording the fingerprint. A further difficulty is that the aforementioned residues or various other types of contamination of the bearing area provided for the finger yield a corrupted fingerprint image or an excessively large number of minutiae.

SUMMARY OF THE INVENTION

It is accordingly an object of the invention to provide a method for disturbance-component-free image acquisition by an electronic sensor which overcomes the above-mentioned disadvantages of the prior art devices of this general type, which is suitable in particular for application with a fingerprint sensor.

With the foregoing and other objects in view there is provided, in accordance with the invention, a method for a disturbance-free image acquisition. The method includes the steps of continuously increasing a coupling between a given object to be imaged and an electronic sensor, using the electronic sensor for recording a sequence of images during the coupling, choosing one of the images from the sequence of images as basic image according to sequence, the real constituent parts of the current image are predetermined criteria, choosing from the sequence of images at least one further image to be a correction image or used for determining the correction image, and correcting the basic image by subtraction of the correction image.

In the method according to the invention, while an object to be imaged is being coupled to the sensor, a sequence of images is recorded in short succession. In particular, in the case of a fingerprint sensor, a sequence of fingerprint images is recorded while a finger is being placed on to the sensor. The image sequence is used in order to determine, by a programmable image processing algorithm or another preferably automatable procedure, which of the imaged details (in particular minutiae of a fingerprint) originate from a currently coupled object (emplaced finger) and what is reproduced only on account of contamination of the sensor area (bearing area). For this purpose, the method ascertains which of the images (which of the fingerprint images) is optimal in the sense that it acquires the current image (the current fingerprint) as well as possible. By comparing the best image with previous images of the relevant sequence, the real constituent parts of the current image are determined and the remaining constituent parts are eliminated from the best image.

Examples of a method that is carried out with a fingerprint sensor that operates capacitively and is illustrated in an overview in the accompanying flow diagram are described below.

In accordance with an added mode of the invention, there are the steps of setting up the electronic sensor to operate capacitively, and increasing the coupling of the given object to be imaged to the electronic sensor by the given object approaching a sensor bearing area of the electronic sensor.

In accordance with an additional mode of the invention, there is the step of choosing the basic image to be the image that a pattern recognition algorithm recognizes as one of most typical for a type of object to be image and as a most clearly pronounced.

In accordance with another mode of the invention, there is the step of choosing the further image for the correction image that, in the sequence of images, appears a specific predetermined number of images before the image chosen as the basic image.

In accordance with a further mode of the invention, there is the step of determining the correction image by averaging over a plurality of images of the sequence of images.

In accordance with another added mode of the invention, there is the step of carrying out a weighted averaging in which the images are taken into account to different extents.

In accordance with a concomitant feature of the invention, there is the step of using a fingerprint sensor as the electronic sensor and acquiring a fingerprint as the given object to be imaged.

Other features which are considered as characteristic for the invention are set forth in the appended claims.

Although the invention is illustrated and described herein as embodied in a method for disturbance-component-free image acquisition by an electronic sensor, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a flow chart for explaining a method for disturbance-component-free image acquisition according to the invention.

DESCRIPTION OF THE PREFERRED EMBODIMENTS

Sensors which effect capacitive measurement and have the property of generating image data when an object to be imaged (finger lines) is still at a distance from the sensor, since, in order to change the acquired capacitance between sensor elements and an object surface, it is not necessary for the object to be completely coupled and for the finger to be in the bearing position. This has the result that the acquired fingerprint image constantly changes while a finger is brought closer and emplaced until a full bearing pressure has been reached on the bearing area. During the operation, the fingerprint image may be determined having undesirable constituent parts caused for example by the state of the bearing area, resulting in details of the finger being only weakly revealed. As the finger is increasingly brought closer to the bearing area, the details of the finger are reproduced clearly. However, to a certain extent, a mixture of undesirable and essential components of the image remains.

In order to be able to eliminate the undesirable Constitute parts from the image, the invention uses a method described in the figure which determines, from a sequence of images that are recorded in short succession one after the other by the sensor, an image that is best suited to further processing, for example by an evaluation of pattern recognition methods known per se. From an image sequence which is recorded while a finger is being placed onto the sensor, steps 10 and 20, an image of the sequence is determined which most likely corresponds to a typical fingerprint or in which the finger lines are most clearly pronounced. The images of the sequence can be recorded at time intervals that are predetermined in a constant fashion. Instead of this, the images can be recorded when predetermined specific minimum changes have resulted compared with the previously recorded image. The method according to the invention is not restricted to a specific algorithm for pattern recognition or image recognition. All that matters in this step of the method is that an image that is suitable as a basic image for the further method steps is selected from the recorded image sequence by methods known per se, step 30.

The basic image is, for example, the first image of the sequence which has at least a predetermined contrast or brightness value or density value, which yields at least a predetermined quality of the result upon application of a (further) algorithm for extraction of the minutiae, which quality may be determined in the simplest case e.g. by a predetermined minimum number of determinable minutiae, or which differs (if appropriate significantly) less from the images recorded directly beforehand and afterward in the image sequence than is otherwise the case for successive images of the sequence (momentary steady state with the finger in the full bearing position). As is evident, the technical teaching that is described here can be used to derive a series of refinements for preferred method steps that can be used to determine a basic image that is suitable for efficiently carrying out the further method steps to be explained. This is done with a complexity that essentially varies within the scope given by the implementation of algorithms that is necessary anyway in a biometric system.

In a further method step 40, a correction image is determined which corresponds to the greatest possible extent to that image by which the fingerprint that is actually to be imaged differs from the selected basic image. The correction image is preferably the last image of the recorded sequence, which just does not as yet, or in any event does not as yet clearly, reproduce the fingerprint, or at least such an image that appears as late as possible in the sequence. The correction image can be selected from the image sequence for example by a predetermined minimum amount for the quality of the image reproduction being exceeded without the basic image already being discernible. A further possibility is to select as the correction image in principle that image which was recorded a specific predetermined number of images in the sequence before the selected basic image.

It is also possible, for determining the correction image, to use a plurality of images of the sequence and to form a suitable average value over the images, for which purpose, in particular, the subdivision into pixels that is usually performed in the case of electronically acquired images is useful. At least for the central pixels or pixels essential in some other way, averaging is effected by way of example and preferably over the gray-scale values of a respective image within a section from the sequence, the gray-scale values being acquired at the relevant pixel by the sensor. The fingerprint image sought can also be generated directly by using, in this averaging, the differences of the respective gray-scale values between the basic image and a respective image from the section of the sequence. The section of the sequence that is used for the averaging is chosen such that it contains images that are already clearly pronounced, but only contain insignificant portions of the actual fingerprint that is currently to be acquired. Depending on the position of the image included in the averaging within the sequence, i.e. depending on the distance of the image from the basic image, it is possible to perform a different weighting of the portion contributed by this image in the average value. Moreover, in the averaging over the differences between and the previous images, it is possible to define a threshold value starting from which a difference determined is only included at all, as significant change, in the calculation.

The examples described here are not restricted to the embodiment of the method with a fingerprint sensor; other sensors for image acquisition in which the problem of after images occurring or disturbance components caused by contamination or the like is to be eliminated and with which an image that contains exclusively these disturbances cannot be recorded can also be enabled, by the method according to the invention, to generate images of the respective object to be imaged that have been freed of the disturbances. To that end, it is necessary only to provide the possibility of recording a sequence of images which are generated in short succession and in which, in addition to the object to be imaged, the disturbance components are also manifested in continuously changing clarity. The basic image is chosen, depending on the sensor used and the type of image generation, in such a way that the disturbance components can easily be eliminated from it by a comparison with the correction image, e.g. other images of the sequence, see step 50.

I claim:

1. A method for a disturbance-free image acquisition, which comprises the steps of:
    providing an electronic sensor for capacitive measurement; continuously increasing a capacitive coupling between a given object to be imaged and the electronic sensor;
    using the electronic sensor for recording a sequence of images during the process of increasing the coupling;
    choosing one of the images from the sequence of images as a basic image according to predetermined criteria;
    choosing from the sequence of images, at least one further image to be one of a correction image and used for determining the correction image; and
    correcting the basic image by subtraction of the correction image.

2. The method according to claim 1, which comprises:
    setting up the electronic sensor to operate capacitively; and
    increasing the coupling of the given object to be imaged to the electronic sensor by the given object approaching a sensor bearing area of the electronic sensor.

3. The method according to claim 1, which comprises choosing the basic image to be the image which a pattern recognition algorithm recognizes as one of a most typical for a type of object to be imaged and as a most clearly pronounced.

4. The method according to claim 1, which comprises choosing the further image for the correction image which, in the sequence of images, appears a specific predetermined number of images before the image chosen as the basic image.

5. The method according to claim 1, which comprises determining the correction image by averaging over a plurality of images of the sequence of images.

6. The method according to claim 5, which comprises carrying out a weighted averaging in which the images are taken into account to different extents.

7. The method according to claim 1, which comprises using a fingerprint sensor as the electronic sensor and acquiring a fingerprint as the given object to be imaged.

* * * * *